United States Patent [19]
Lee

[11] Patent Number: 5,620,199
[45] Date of Patent: Apr. 15, 1997

[54] SUSPENSION SYSTEM FOR VEHICLE

[75] Inventor: Unkoo Lee, Kyungki-do, Rep. of Korea

[73] Assignee: Hyundai Motor Company, Seoul, Rep. of Korea

[21] Appl. No.: 436,450

[22] PCT Filed: Dec. 8, 1994

[86] PCT No.: PCT/KR94/00174

§ 371 Date: May 22, 1995

§ 102(e) Date: May 22, 1995

[87] PCT Pub. No.: WO95/15865

PCT Pub. Date: Jun. 15, 1995

[30] Foreign Application Priority Data

Dec. 10, 1993 [KR] Rep. of Korea ............... 93-27181
Dec. 10, 1993 [KR] Rep. of Korea ............... 93-27185

[51] Int. Cl.[6] ..................... B60G 3/00; B62D 17/00
[52] U.S. Cl. ................. 280/691; 280/661; 280/673
[58] Field of Search ................... 280/95.1, 96.1, 280/660, 661, 673, 675, 691

[56] References Cited

U.S. PATENT DOCUMENTS

| 4,854,603 | 8/1989 | Scaduto | 280/675 |
|---|---|---|---|
| 4,911,466 | 3/1990 | Blair | 280/691 |
| 4,927,169 | 5/1990 | Scaduto | 280/661 |
| 5,257,801 | 11/1993 | Matsuzawa et al. | 280/691 |
| 5,346,241 | 9/1994 | Lee | 280/691 |
| 5,372,377 | 12/1994 | Lee | 280/691 |
| 5,435,591 | 7/1995 | Lee | 280/691 |

FOREIGN PATENT DOCUMENTS

| 0506141A1 | 9/1992 | European Pat. Off. . |
|---|---|---|
| 1363520 | 8/1971 | United Kingdom . |
| 2208216A | 3/1989 | United Kingdom . |
| 91-08918 | 6/1991 | WIPO . |

*Primary Examiner*—Paul N. Dickson
*Attorney, Agent, or Firm*—Birch, Stewart, Kolasch & Birch, LLP

[57] ABSTRACT

The present invention relates to a suspension system which can enhance driving safety and margin cornering performance by optimally controlling the camber and tread changes as well as roll center in accordance with vehicle's driving conditions. The suspension system includes a wheel carrier supporting a wheel and having upper and lower ends, a lower control arm connecting the lower end of said wheel carrier to a vehicle body, an upper control arm for connecting the upper end of the wheel carrier to the vehicle body, and a strut assembly formed by uniting a shock absorber and a spring to absorb an up-and-down vibration of the vehicle body, and a camber control member provided for controlling the camber of the wheel by pushing the lower control arm to a wheel side and pulling the upper control arm to a vehicle body side when the wheel pumps or rebounds, the camber control member including first, second and third hinge points connected to the respective one of the upper control arm, lower control arm and the strut assembly.

16 Claims, 7 Drawing Sheets

Change of Camber

FIG.4B

Change of Tread

SUSPENSION SYSTEM FOR VEHICLE

BACKGROUND OF THE INVENTION

1. Field of the Invention

The present invention relates to a suspension system for a vehicle and, more particularly, to the suspension system which can enhance driving safety and marginal cornering performance by optimally controlling the camber and tread changes as well as roll center in accordance with vehicle's driving conditions.

2. Description of Related Art

In general, the primary functions of a suspension system are to (A) provide vertical compliance so wheels can follow the uneven road, isolating a vehicle body from roughness in the road, (B) maintain the wheels in the proper steer and camber attitudes to the road surface, and (C) react to the control forces produced by the tires-longitudinal (acceleration and braking) force, lateral(cornering) forces, and braking and driving torques, (D) resist roll, yaw and pitch of the vehicle body.

The suspension system is structurally characterized as solid axle and independent suspension types. The suspension system of the present invention concerns the independent suspension system. There are MacPherson strut type and Wishbone type suspension systems in the independent suspension systems. And in recent years, a multi-link type independent suspension system has been popular.

Figure 6A:
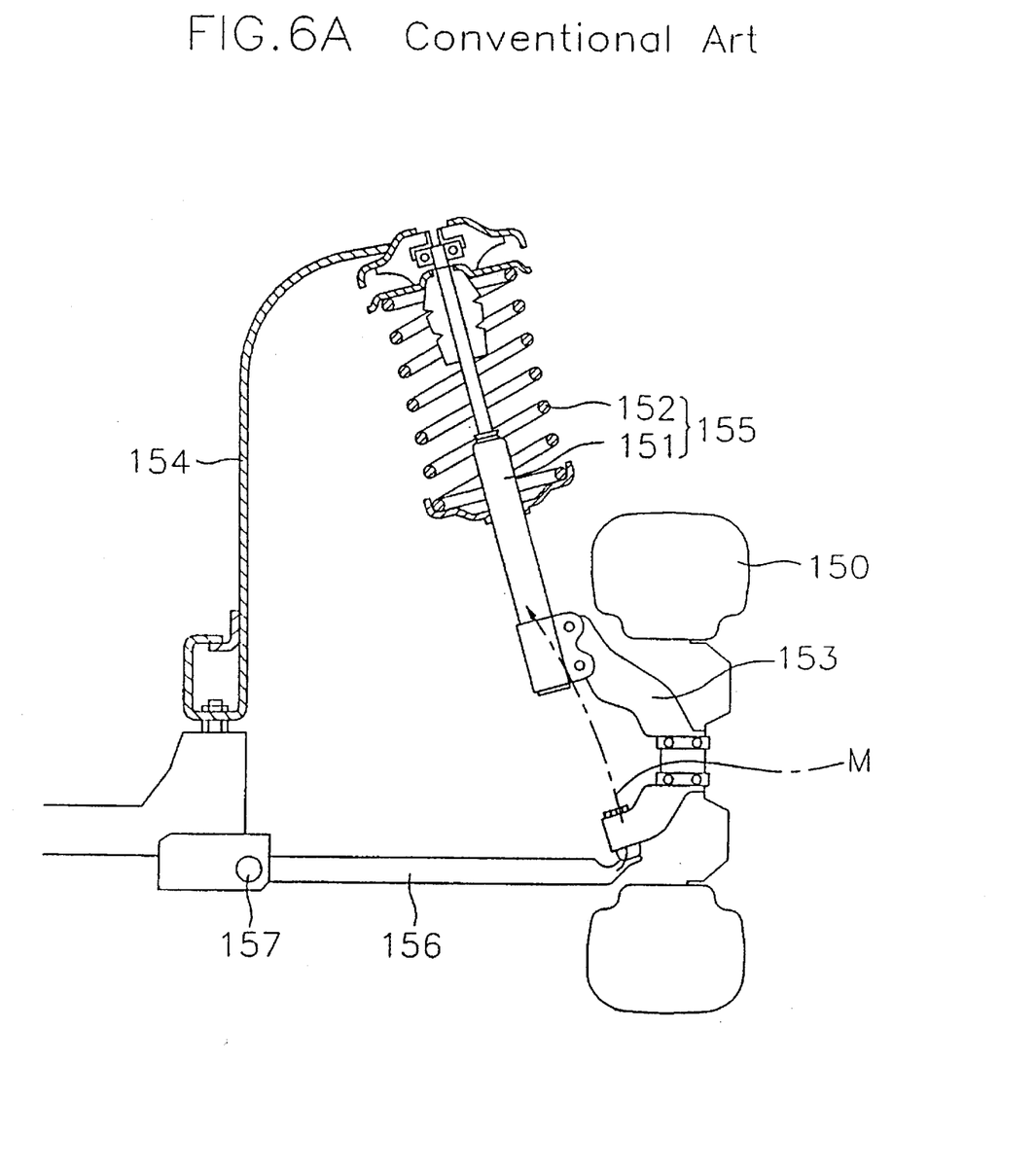
FIG. 6A is a view illustrating a conventional MacPherson type suspension system.

FIG. 6A illustrates a general MacPherson strut type suspension system which comprises a strut assembly 155 formed by uniting a shock absorber 151 and a spring 152 and having a lower end fixed to a wheel carrier 153 rotatably supporting a wheel 150 and an upper end supportably connected to a vehicle body 154; and a lower control arm 156 connecting a lower end of the wheel carrier 153 to a lower side of the vehicle body 154.

The range of a wheel's up-and-down movement in this suspension system is determined by the lower control arm 156 during a wheel's up-and-down vibration. The vibration is absorbed by an elastic bushing formed on an inner end of the lower control arm. Shock from a road surface is absorbed by the shock absorber 151 and spring 152 of the strut assembly 155.

However, when considering operation steps of the above described suspension system, if the wheel 150 vibrates upward and downward in accordance with driving conditions, the wheel 150 moves upward and downward in a state where the length of the lower control arm 156 is fixed.

Accordingly, the wheel 150 moves upward and downward along a tracing movement M which is formed by the length of lower control arm 156. A camber and a tread are changed according to the wheel's up-and-down movement and has a great effect on riding comfort, cornering performance, and driving safety of the vehicle.

That is, since the outer end of the lower control arm 156 is designed to be lower than the wheel center, when the wheel moves along the tracing movement M, in a normal ascending section, the lower side of the wheel is pushed outward, that is, to the wheel side, along a curvature of the tracing movement M such that the camber is changed to negative(−).

Figure 4A:
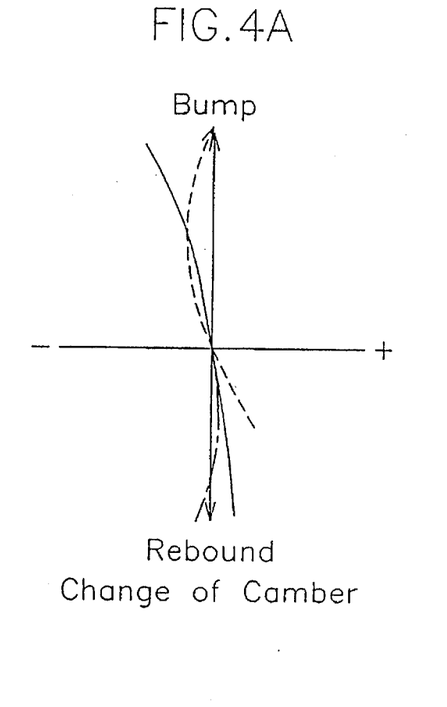
FIG. 4A is a graph for comparing a camber change between the suspension system of the present invention and conventional suspension systems.

However, in a section over the normal ascending section, the lower control arm 156 ascends and pulls the lower side of the wheel to the vehicle body side, whereby the camber is changed again to positive(+) (See broken line of FIG. 4A).

The change of the camber as described above is illustrated in broken line of FIG. 4A. Further a tread is changed as illustrated in broken line of FIG. 4B by the change of the camber described above. Such changes of the camber and tread have a bad effect on the cornering performance and the straight-ahead driving safety.

Figure 6B:
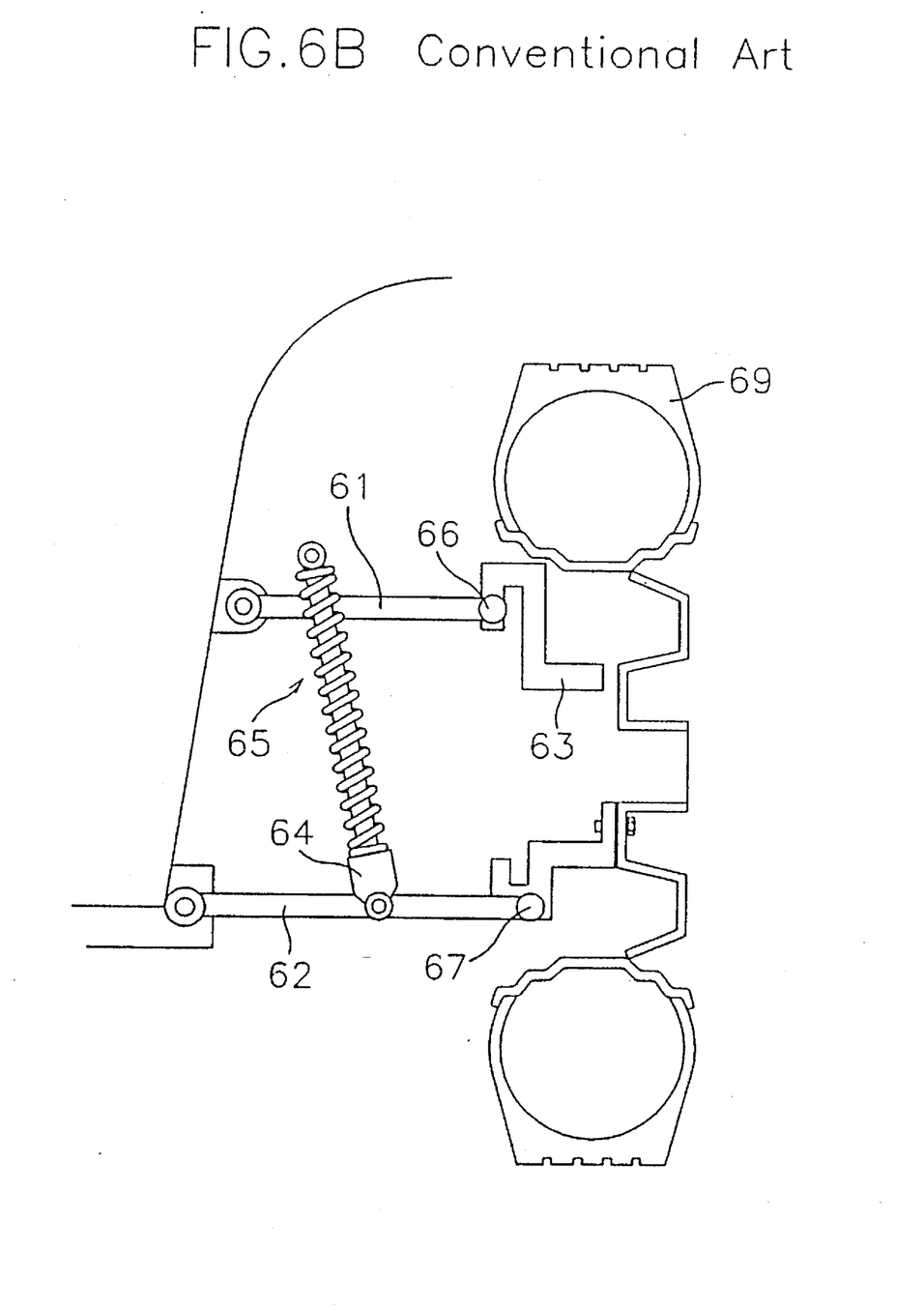
FIG. 6B is a view illustrating a conventional Wishbone type suspension system.

FIG. 6B illustrates a general Wishbone type suspension system, including upper and lower control arms 61 and 62, a steering knuckle 63, a spring assembly 65 including a shock absorber 64, and ball joints 66 and 67 respectively connecting the upper and lower control arms 61 and 62 to the steering knuckle 63.

Figure 4B:
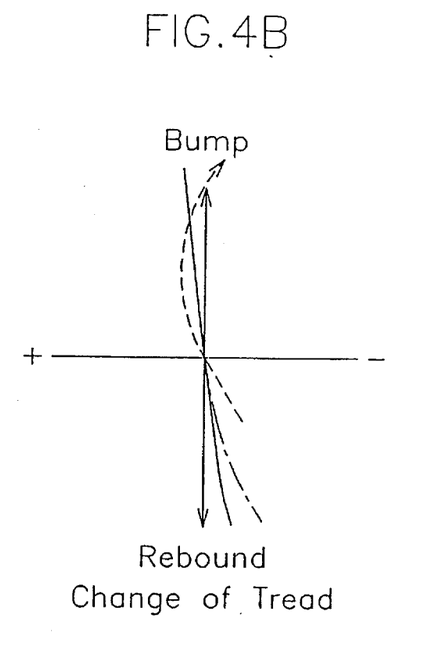
FIG. 4B is a graph for comparing a tread change between a suspension system of the present invention and conventional suspension systems.

This type of suspension system has a problem that when the wheel 69 moves upward and downward, since the upper control arm 61 has a small curvature tracing movement and the lower control arm 62 has a large curvature tracing movement, the tread and camber are severely changed(See dot-dash line of FIGS. 4A and 4B).

Figure 5:
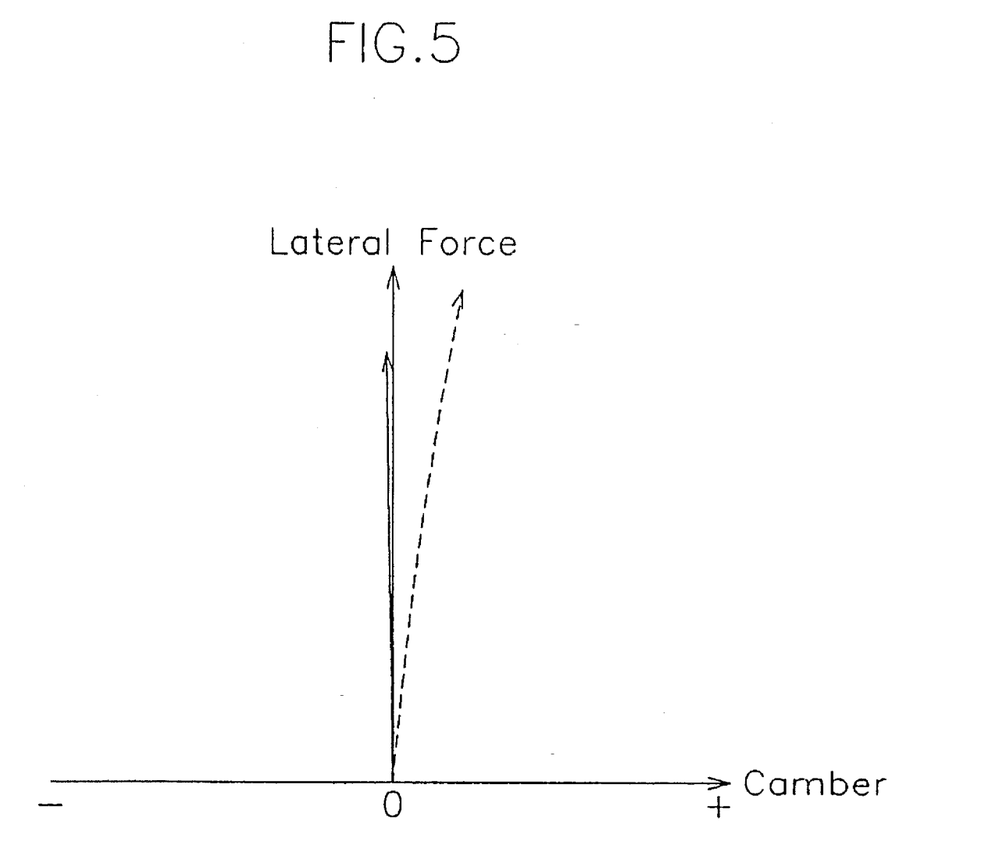
FIG. 5 is a graph illustrating a camber change in response to a lateral force of a suspension system of the present invention compared to conventional suspension systems.

Further, as shown in broken line of FIG. 5, in the Wishbone and Macpherson type suspension systems, when the vehicle is cornering, the more wheel on the outer side of turn to receive the lateral force, the more camber is changed to the positive(+), thereby deteriorating the marginal cornering performance.

SUMMARY OF THE INVENTION

Accordingly, the present invention has been made in an effort to solve the above-described problems.

It is an object of the present invention to provide a suspension system which can ideally control the camber and the tread through a movement range of the wheel, that is, the range from the bump to rebound, thereby improving marginal cornering performance, driving safety and riding comfort.

To achieve the above object, the present invention provides a suspension system for a vehicle, comprising: a wheel carrier supporting a wheel, said wheel carrier having upper and lower ends; a lower control arm connecting the lower end of said wheel carrier to a vehicle body; an upper control arm for connecting the upper end of said wheel carrier to the vehicle body; and a strut assembly formed by uniting a shock absorber and a spring to absorb an up-and-down vibration of the vehicle body; wherein means are provided for controlling the camber of the wheel by pushing said lower control arm to a wheel side and pulling the upper control arm to a vehicle body side when the wheel pumps or rebounds, said means including first, second and third hinge points connected to the respective one of said upper control arm, lower control arm and the strut assembly.

As an aspect of the present invention, said means for controlling includes a hinge portion pivotally connected to said lower control arm to thereby form the first hinge point, a horizontal arm extending toward the vehicle body side from the hinge portion, and a vertical arm extending from the hinge portion toward said upper control arm and pivotally connected to said upper control arm to thereby form the second hinge point, and wherein said strut assembly having an upper end supportably connected to the vehicle body and a lower end pivotally connected to an inner end of the horizontal arm of said means to thereby form the third hinge point.

As another aspect of the present invention, said means for controlling includes a hinge portion pivotally connected to said upper control arm to thereby form the first hinge point, a horizontal arm extending from the hinge portion toward the vehicle body, and a vertical arm extending from the hinge portion toward said lower control arm and pivotally connected to said lower control arm to thereby form the second hinge point, and wherein said strut assembly having an upper end supported to the vehicle body and a lower end pivotally connected to an inner end of the horizontal arm of said means for controlling to thereby form the third hinge point.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE EMBODIMENT

Figure 1:
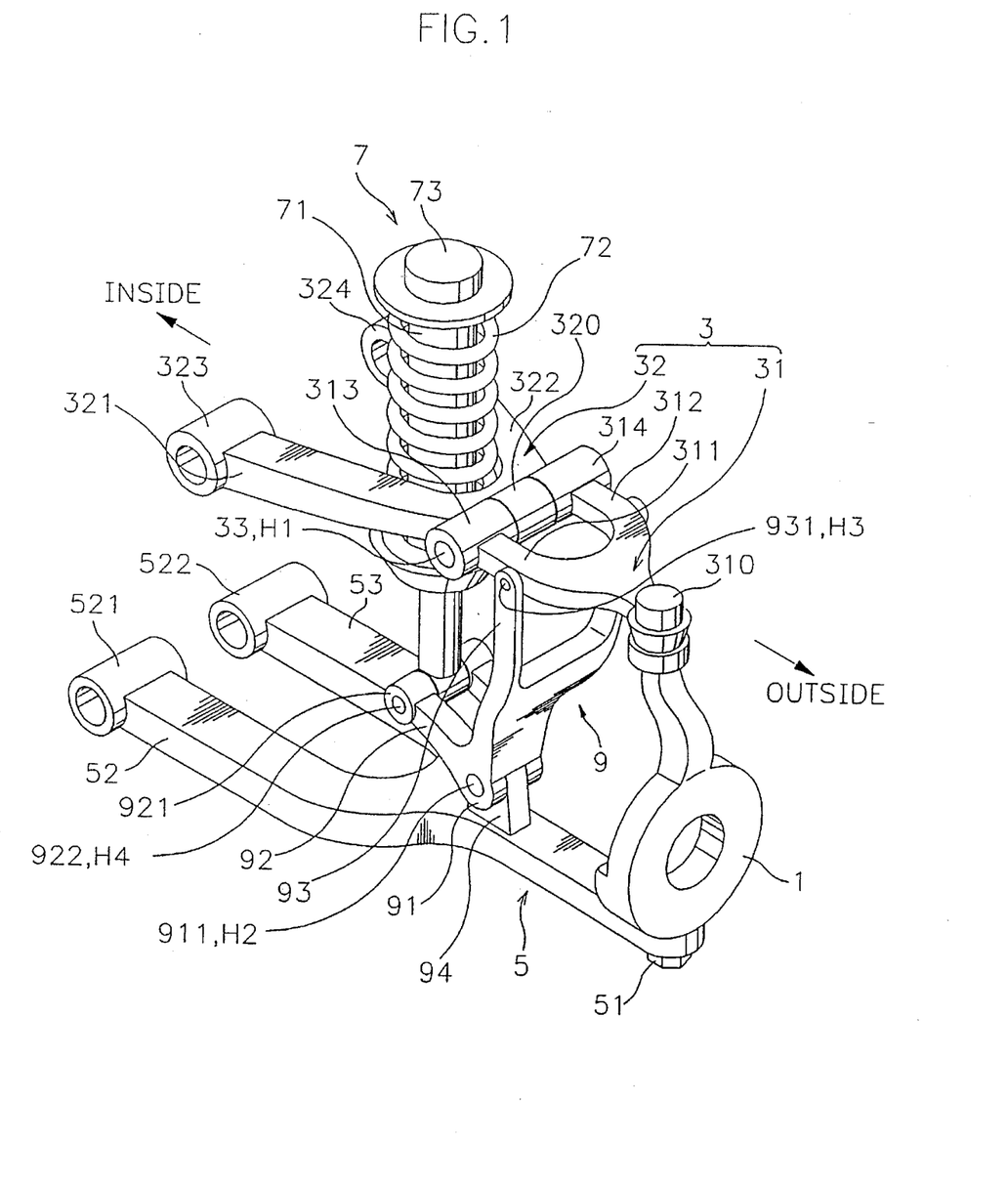
FIG. 1 is a perspective view of a suspension system in accordance with a first embodiment of the present invention.

FIG. 1 illustrates a suspension system in accordance with a first embodiment of the present invention. The suspension system includes a wheel carrier 1 rotatably supporting a wheel (not shown), an upper control arm 3 connecting the upper end of the wheel carrier 1 to a vehicle body (not shown), a lower control arm 5 connecting the lower end of the wheel carrier 1 to the vehicle body, a strut assembly 7 formed by uniting a shock absorber 71 and a spring 72, and a camber control member 9 interconnecting the upper and lower control arms 3 and 5.

The upper control arm 3 includes first and second control arms 31 and 32 both of which are of Y-shaped construction. The first control arm 31 is attached at its outer end to the wheel carrier 1 by means of a ball joint 310 and has front and rear links 311 and 312 diverging from the outer end. Bushings 313 and 314 are formed on the inner ends of each front and rear link 311 and 312, respectively, and are pivotally coupled with a bushing 320 formed on the outer end of the second control arm 32 by means of a pin 33 to thereby form a moving hinge point H1. The second control arm 32 has front and rear links 321 and 322 which diverge from its outer end provided with the bushing 320 and are mounted at their inner ends to the vehicle body by means of bushings 323 and 324 that allow up and down movement of the outer end of the second control arm 32.

The lower control arm 5 is also of Y-shaped construction and attached at its outer end to the wheel carrier 1 by a ball joint 51. The lower control arm 5 has front and rear links 52 and 53 mounted at their inner ends to the vehicle body by means of bushings 521 and 522, respectively.

Each bushing 323, 324 and 521, 522 has an elastic force to control the up and down movement of the respective upper and lower control arms 3 and 5.

The camber control member 9 connecting the lower control arm 5 to the upper control arm 3 includes a hinge portion 91 pivotally coupled by a pin 911 to a bracket 94 integrally mounted on an upper surface of the lower control arm 5 thereby forming a hinge point H2, a pair of horizontal arms 92 integrally extending from the hinge portion 91 to the vehicle body side, and a pair of vertical arms 93 integrally extending from the hinge portion 91 upward and pivotally coupled to the first control arm 31 of the upper control arm 3 by respective pins 931 thereby forming a hinge point H3.

The strut assembly 7 for absorbing a shock transmitted to the vehicle body in the up-and-down direction is connected at its upper end to a vehicle body by means of an insulator 73 and at its lower end to a pair of bushings 921 formed on the inner ends of the horizontal arms 92 of the camber control member 9 by respective pins 922 to thereby form a hinge point H4.

Figure 2:
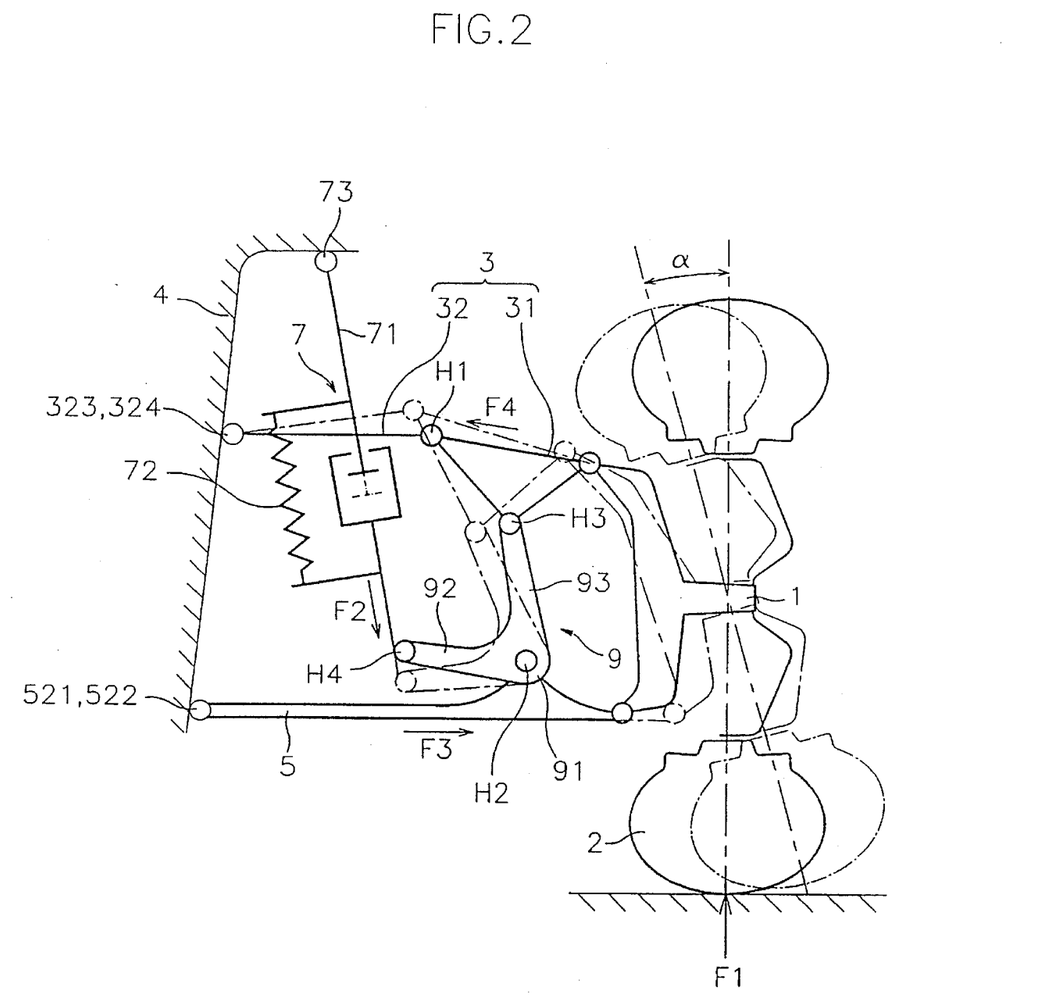
FIG. 2 is a schematic front view illustrating an operating state of the suspension system in FIG. 1.

FIG. 2 illustrates an operating state of the above described suspension system.

When the wheel 2 receives force F1 from an uneven road or during cornering to thereby bump, the force F1 is absorbed by the strut assembly 7 and, at the same time the inner end of the horizontal arm 92 pivotally connected to the lower end of the strut assembly 7 receives a reacting force F2 of the spring 72 such that the camber control member 9 rotates in the counter-clockwise direction on the basis of the hinge point H2 in the drawing.

Accordingly, the force F2 acts as force F3 which pushes the lower control arm 5 connected to the camber control member 9 outward such that the wheel bumps while pulling the bushings 521 and 522 of the lower control arm 5 to the wheel side by using an elasticity of these bushings 521 and 522.

At this point, since the camber control member 9 rotates in the counter-clockwise direction, the first control arm 31 on which the upper end of the vertical arm 93 of the camber control member 9 is connected receives a force F4 which pushes the first control arm 31 inward and upward. As a result, the first control arm 31 pulls the upper end of the wheel carrier 1 to the vehicle body side while the hinge point H1 on which the first and second control arms are connected with each other moves upward.

As described above, the lower end of the wheel carrier 1 is pushed to the outer side, that is, the opposite side of the vehicle body, and the upper end of the wheel carrier 1 is pushed to the inner side, that is, the vehicle body side. Accordingly, when the wheel 2 is in bump or rebound, as shown in dot-dash line of FIG. 2, the camber angle α is changed to negative(−).

The change of the camber as described above is illustrated in solid line of FIG. 4A. That is, the camber of the present invention is changed to negative(−) linearly compared to the camber change of the conventional art.

Further the tread is changed as illustrated in solid line of FIG. 4B by the camber change of the present invention described above. That is, the tread is slightly changed to positive(+) linearly.

Accordingly, when the vehicle is in a straight ahead position, since a few change of camber occurs, straight ahead driving safety is greatly improved as well as riding comfort.

Figure 3:
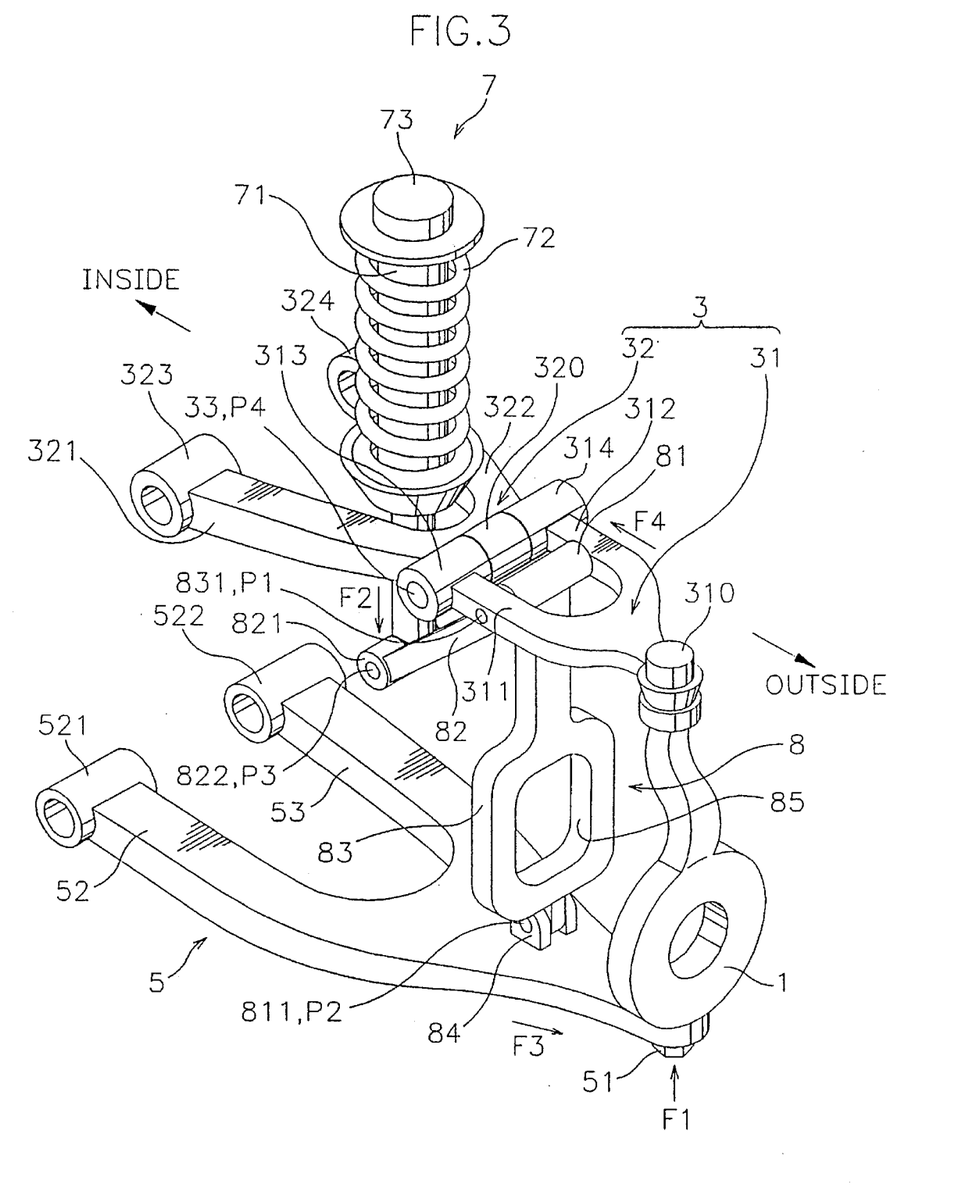
FIG. 3 is a perspective view of a suspension system in accordance with a second embodiment of the present invention.

FIG. 3 illustrates a suspension system in accordance with a second embodiment of the present invention, which can be applied to the drive wheel. In this embodiment, the same elements as those in the previously described embodiment are designated by the same reference numerals and the description thereof will be omitted for simplicity.

In this embodiment, the structures of upper and lower control arms are the same as those of the first embodiment but the connecting structure of the camber control member is modified to accept a drive shaft.

That is, as shown in FIG. 3, a camber control member 8 connecting the lower control arm 5 to the upper control arm 3 includes a hinge portion 81 pivotally connected to the first control arm 31 by means of a pin 831 to thereby form a hinge point P1, a horizontal arm 82 integrally extending from the hinge portion 81 inward and downward, and a vertical arm 83 integrally extending downward from the hinge portion 81 and pivotally fixed to a bracket 84 formed on the upper surface of the lower control arm 5 by a pin 811 to thereby form a hinge point P2.

The strut assembly 7 for absorbing a shock transmitted to the vehicle body in the up-and-down direction is connected at its upper end to the vehicle body by means of the insulator 73 and at its lower end with a bushing 821 formed at the inner end of the horizontal arm 82 of the camber control member 8 by a pin 822, pivotally, thereby forming a hinge point P3.

Further, the vertical arm 83 is provided with a hole 85 through which the drive shaft (not shown) can be penetrated.

According to this embodiment, when the wheel receives force F1 from the uneven road or during cornering to thereby bump, the force F1 is absorbed by the strut assembly 7 and, at the same time the inner end of the horizontal arm 82 connected to the lower end of the strut assembly 7 receives a reacting force F2 of the spring 72 such that the camber control member 8 rotates in the counter-clockwise direction on the basis of the hinge point P1 when viewed from the drawing.

Accordingly, the force F2 acts as a force F3 which pushes the lower control arm 5 coupled to the camber control member 8 to the wheel side such that the wheel ascends while pulling the inner end of the lower control arm 7 to the wheel side by using an elasticity of the bushings 821 and 822.

Further, since the camber control member 8 rotates in the counter-clockwise direction, the first control arm 31 receives force F4 which pushes the first control arm 31 inward. As a result, the first control arm 31 pulls the upper end of the wheel carrier to the vehicle side while the hinge point P4 where the first and second control arms 31 and 32 connected with each other moves upward.

The camber and tread changes of the suspension system according to the second embodiment are the same as those in the previously described embodiment and the description thereof is omitted.

In the suspension systems of each first and second embodiment of the present invention as described above, when the vehicle is cornering, the camber in response to the lateral force of the wheel on the outer side of the turn is maintained regularly as shown in the solid line of FIG. 5.

The suspension system of the present invention is designed such that the reacting force F2 is changed into forces F3 and F4 when the wheel bumps or rebounds by an uneven road or during cornering, whereby the wheel(on the outer side of the turn) is changed to negative(−) camber by a force-compliance. Particularly, the suspension system prevents the wheel on the outer side of the turn from being changed to positive(+) camber such that the margin cornering performance is improved by increasing a grip force of a tire.

Although preferred embodiments of the present invention have been described in detail hereinabove, it should be clearly understood that many variations and/or modifications of the basic inventive concepts herein taught which may appear to those skilled in the pertinent art will still fall within the spirit and scope of the present invention, as defined in the appended claims.

What is claimed is:

1. A suspension system for a vehicle, comprising:

a wheel carrier supporting a wheel, said wheel carrier having upper and lower ends;

a lower control arm connecting the lower end of said wheel carrier to a vehicle body;

an upper control arm for connecting the upper end of said wheel carrier to the vehicle body;

a strut assembly formed by uniting a shock absorber and a spring to absorb an up-and-down vibration of the vehicle body; and camber control means pivotally connected to a respective one of said upper control arm, said lower control arm at a position spaced from said wheel carrier, and said strut assembly to receive a force from said strut assembly for pushing said lower control arm towards the wheel and pulling said upper control arm towards the vehicle body.

2. The suspension system according to claim 1, wherein said camber control means includes a hinge portion pivotally connected to said lower control arm to form a first hinge point, a horizontal arm extending toward the vehicle body side from the hinge portion, and a vertical arm extending from the hinge portion toward said upper control arm and pivotally connected to said upper control arm to thereby form a second hinge point, and wherein said strut assembly includes an upper end supportably connected to the vehicle body and a lower end pivotally connected to an inner end of the horizontal arm of said camber control means to thereby form a third hinge point.

3. The suspension system according to claim 1, wherein said camber control means includes a hinge portion pivotally connected to said upper control arm to form a first hinge point, a horizontal arm extending from the hinge portion toward the vehicle body, and a vertical arm extending from the hinge portion to said lower control arm to form a second hinge point, and wherein said strut assembly has an upper end connected to the vehicle body and a lower end pivotally connected to an inner end of the horizontal arm of said camber control means to thereby form third hinge point.

4. The suspension system according to claim 2, wherein said upper control arm includes a first control arm to which the vertical arm of said camber control means is pivotally connected, and a second control arm pivotally connected to the first control arm.

5. The suspension system according to claim 3, wherein the upper control arm comprises a first control arm to which the hinge portion of said camber control means is pivotally connected, and a second control arm pivotally connected to the first control arm.

6. The suspension system according to claim 1, where one end of each upper and lower control arm is connected with the vehicle body by a bushing and the other end of each upper and lower control arm is connected with the wheel carrier by a ball joint.

7. The suspension system according to claim 3, wherein the vertical arm of said camber control means is provided with a hole through which a drive axle can be penetrated.

8. The suspension system according to claim 4, wherein the first and second arms are interconnected by interposing a bushing.

9. The suspension system according to claim 5, wherein the first and second arms are interconnected by interposing a bushing.

10. A suspension system for a vehicle, comprising:

a wheel carrier supporting a wheel, said wheel carrier having upper and lower ends;

a lower control arm connecting the lower end of said wheel carrier to a vehicle body;

an upper control arm for connecting the upper end of said wheel carrier to the vehicle body;

a strut assembly formed by uniting a shock absorber and a spring to absorb an up-and-down vibration of the vehicle body; and camber control means for controlling the camber of the wheel by pushing said lower control arm to a wheel side and pulling the upper control arm to a vehicle body side when the wheel bumps or rebounds, said camber control means including first, second and third hinge points connected to the respective one of said upper control arm, lower control arm and the strut assembly, wherein said camber control means includes a hinge portion pivotally connected to said upper control arm to thereby form the first hinge point, a horizontal arm extending toward the vehicle body side from the first hinge point, and a vertical arm extending from said first hinge point and pivotally connected to said lower control arm to form the second hinge point, and wherein said strut assembly includes an upper end connected to the vehicle body and a lower end pivotally connected to an inner end of the horizontal arm of said camber control means to form the third hinge point.

11. The suspension system according to claim 10, wherein said upper control arm includes a first control arm to which the vertical arm of said camber control means is pivotally connected, and a second control arm pivotally connected to the first control arm.

12. The suspension system according to claim 10, where one end of each upper and lower control arm is connected with the vehicle body by a bushing and the other end of each upper and lower control arm is connected with the wheel carrier by a ball joint.

13. The suspension system according to claim 11, wherein the first and second arms are interconnected by interposing a bushing.

14. A suspension system for a vehicle, comprising:

a wheel carrier supporting a wheel, said wheel carrier having upper and lower ends;

a lower control arm connecting the lower end of said wheel carrier to a vehicle body;

an upper control arm for connecting the upper end of said wheel carrier to the vehicle body;

a strut assembly formed by uniting a shock absorber and a spring to absorb an up-and-down vibration of the vehicle body; and camber control means for controlling the camber of the wheel by pushing said lower control arm to a wheel side and pulling the upper control arm to a vehicle body side when the wheel bumps or rebounds, said camber control means including first, second and third hinge points connected to the respective one of said upper control arm, lower control arm and the strut assembly, wherein said camber control means includes a hinge portion pivotally connected to said lower control arm to thereby form the first hinge point, a horizontal arm extending from the first hinge point and a vertical arm extending from said first hinge point and pivotally connected to said upper control arm to form the second hinge point, and wherein said strut assembly has an upper end connected to the vehicle body and a lower end pivotally connected to an inner end of the horizontal arm of said camber control means to form the third hinge point.

15. The suspension system according to claim 14, wherein the upper control arm comprises a first control arm to which the hinge portion of said camber control means is pivotally connected, and a second control arm pivotally connected to the first control arm.

16. The suspension system according to claim 15, wherein the first and second arms are interconnected by interposing a bushing.

* * * * *